TRANSLATING AND SELECTING SYSTEM

Filed April 28, 1949 2 SHEETS—SHEET 1

INVENTOR
T. L. DIMOND
BY William F. Simpson.
ATTORNEY

Oct. 14, 1952 T. L. DIMOND 2,614,175

TRANSLATING AND SELECTING SYSTEM

Filed April 28, 1949 2 SHEETS—SHEET 2

INVENTOR
T. L. DIMOND
BY
William F. Simpson

ATTORNEY

UNITED STATES PATENT OFFICE 2,614,175

TRANSLATING AND SELECTING SYSTEM

Thomas L. Dimond, Rutherford, N. J., assignor to Bell Telephone Laboratories, Incorporated, New York, N. Y., a corporation of New York Application April 28, 1949, Serial No. 90,260

15 Claims. (Cl. 179—18)

This invention relates to translating methods, apparatus and equipment and more particularly to high speed translating equipment employing electronic devices.

In translating mechanisms in the prior art the apparatus and equipment is rather heavy and slow in operating or else the translating equipment is relatively inflexible due to the fact that the connections or interconnections must be made on at least a semipermanent basis so that when it is desired to change the translations obtained from any given set of input conditions, it is necessary to rewire or change the cross-connections within the equipment. This rewiring or changing of connections becomes quite expensive when it is necessary to make changes at frequent intervals as in the case where the translating equipment is employed in telephone switching systems.

An object of the present invention is to overcome the difficulties of the mechanisms in the prior art and to provide an improved high speed translating equipment employing electronic discharge tubes together with a simple inexpensive arrangement for rapidly changing the output translation which may be obtained from any given input information. A feature of this invention relates to a translating arrangement employing electronic tubes having a residual gas at reduced pressure which may have discharges initiated through them by the voltage applied to conducting material adjacent but external to the tubes. Any suitable inert or other gas or vapor or mixtures thereof may be employed in the tubes.

A feature of this invention relates to a translating arrangement employing a plurality of cards in combination with a plurality of gaseous discharge tubes and employing conductive material on or in the cards, but external to the tubes to control discharges within the tubes.

A feature of the invention relates to circuits and apparatus for preventing interference between the various tubes and the control circuits therefor.

In accordance with a specific embodiment of this invention, a card translator is arranged to work in an automatic telephone switching system of the type disclosed in an application of A. J. Busch, Serial No. 57,394, filed October 29, 1948, which issued as Patent 2,585,904 on February 19, 1952, and may be substituted for the number group circuit of that application and patent, for translating the directory number of the called subscriber into designations locating the line upon the switches and switching frames. In accordance with one exemplary embodiment of this invention one of a plurality of conductors is selected by at least a portion of the directory number of the called subscriber. The selected conductor is placed adjacent selected ones of a plurality of gas tubes. When it is desired to change the translations between directory numbers and line location it is merely necessary to change the selected conductor so that it passes adjacent the desired tubes.

In accordance with another exemplary embodiment of this invention a translator comprises a plurality of two-element gaseous conduction tubes of small diameter but of considerable length extending through holes in each of the plurality of cards. The cards are provided with electric conducting material which extends adjacent to predetermined ones of the gaseous discharge tubes. The cards in one embodiment may also include a conductive shield member or device which effectively shields the conducting material individual to each of the cards so that when a potential is applied to this material the potential will not cause improper operation of any of the tubes but cause a discharge to be initiated within a desired group of the tubes only.

In accordance with this second embodiment the tubes are mounted upon a movable panel or array so that they may be readily inserted in perforations in cards of the card file. By so mounting the tubes relative to the cards it is a simple matter to remove the tubes and then change the cards as desired when it is necessary or desirable to change the translation obtained from the translating equipment. Thus when it is desired to relocate a line it is only necessary to move the tubes out, take out an old card, put in a new card and reinsert the tubes and the equipment will thereafter direct the calls to the new location of the line.

In a specific embodiment employing a translating arrangement in accordance with this invention in a telephone switching system of the type referred to above, one of the cards is selected in accordance with the directory number of the called telephone and a potential applied to a conductor on or in the card which conductor extends adjacent to the predetermined ones of the tubes.

The tubes comprise two elements within an evacuated envelope containing a gas at low pressure. As has been known in the prior art, if a potential difference is maintained between the elements of the tubes which potential difference is insufficient to initiate a discharge between the elements of the tubes, but sufficient to maintain a discharge between these elements if a discharge is initiated within the tube, a discharge may be initiated within the tube by applying suitable voltage or potential conditions to a conductive element or elements adjacent to but outside the tube. The potential or voltage conditions applied to the tube may comprise an alternating-current voltage, a pulse of short duration or a voltage step; i. e. a voltage which abruptly changes from one value to another. The application of such voltages to electrodes or conductors outside but adjacent the glass envelope of the gaseous conduction tube will initiate a discharge through the tube. It is believed that such voltages or pulses create a sufficiently high potential gradient within the envelope or upon the inside surface of the envelope to initiate a discharge within the tube which discharge causes current to flow between the electrodes which current is maintained by the potential differences applied between these elements.

The tubes are connected to the telephone switching system and supply the information to it relative to the location of the desired line. Thus when each tube has a discharge initiated through it the discharge current causes one or more relays to be operated in the telephone system which relay or relays, in operating, records a portion of the designation of the location of the called subscriber's line.

The foregoing objects and features of this invention can be more readily understood from the following description when read with reference to the attached drawings which are illustrative of the principles of the invention as incorporated in telephone switching systems.

Figures 1, 2:
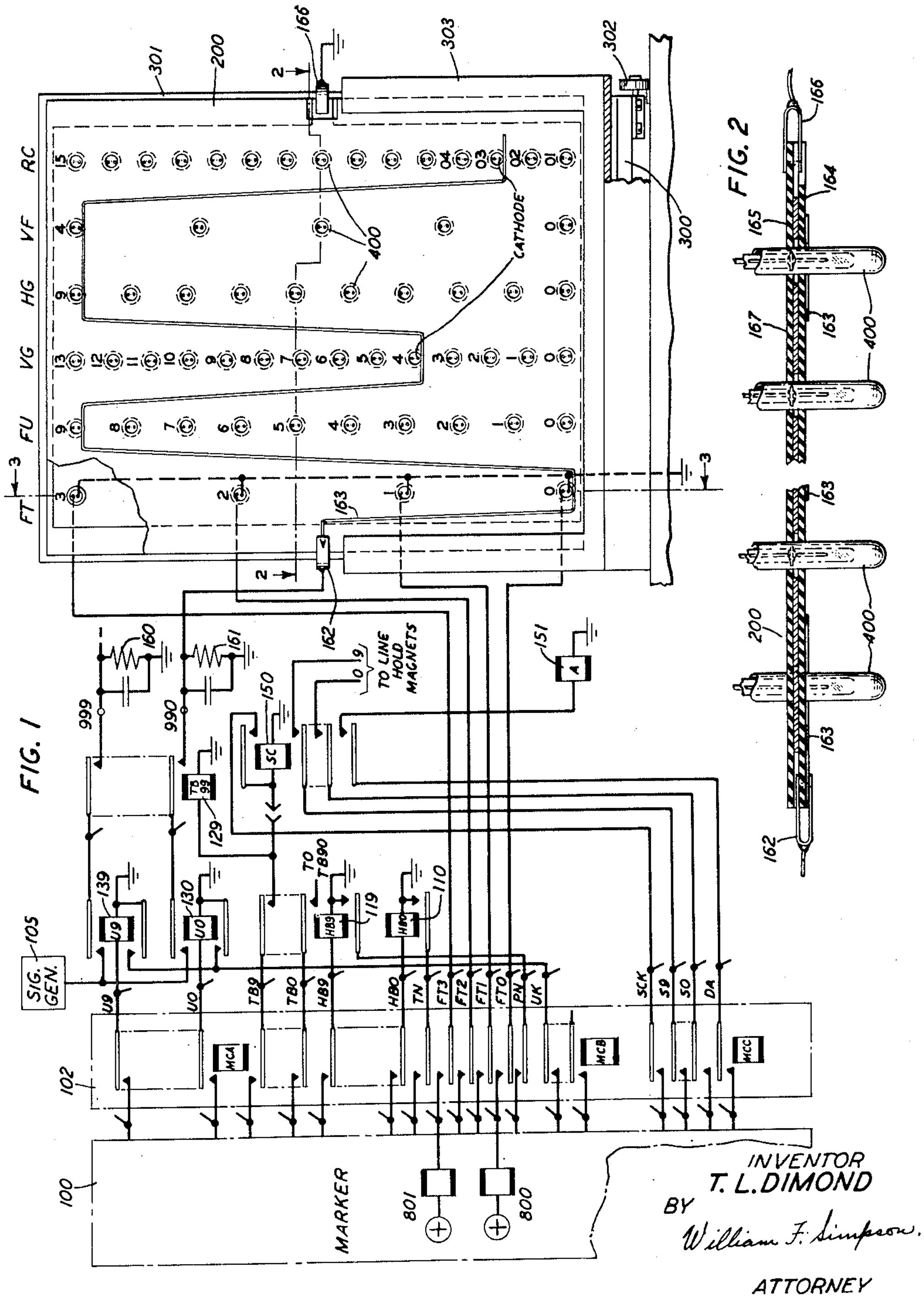
Fig. 1 shows in outline form the various connections between an electronic card translating arrangement and a telephone switching system of the type identified above.
Fig. 2 is a partial section along lines 2—2 of Fig. 1 and shows details of one card and the manner in which the voltages are applied to the conductive material of the card and also the manner in which the card cooperates with the two-element electronic discharge tubes.

In Fig. 1 the rectangle 100 represents the marker circuit of the above-identified application for United States Letters Patent of Busch. The said Busch application is hereby made a part of the present application as is fully included herein.

As set forth in the above-identified application of Busch the called subscriber's directory number is transferred to the marker circuit of the system set forth in said Busch application. The marker circuit then selects one of a plurality of translating circuits in accordance with the thousands digit of the called subscriber's directory number, there being a different translating circuit for each one of the different thousands digits of the subscriber's number or ten in all. In order to seize such a circuit the marker must wait until the selected translating or number group circuit is idle, and then wait its turn in case more markers desire to use the same circuit, and thereafter make the number group circuit busy while the marker circuit is using it so that other markers will be prevented from interfering with the operation of the seized number group circuit.

The sequence circuit, busy test circuit, seizing circuit by which the marker performs these functions as well as other testing and checking circuits are not shown or repeated in the present application. It is assumed, however, that the circuits set forth in detail in the above-identified Busch application, or other circuits performing equivalent functions, are provided to perform these functions.

The marker circuit in seizing the number group circuit causes the relay in the marker connector circuit to operate and connect the marker circuit to the number group circuit and prevents other markers from seizing this number group circuit. The marker circuit then applies voltage conditions to one conductor in each of three groups of ten conductors extending to the number group circuit. These potential conditions are then translated into a number of different potential conditions which are employed to designate the location of the line in a switching system, that is, upon the switches and the switch frames.

As set forth in the above-identified application to Busch, upon the seizure of the number group circuit the marker will apply the voltage conditions to one of the ten hundreds digit leads, two of which are illustrated in Fig. 1 and designated HB0 and HB9. Assume for purposes of illustration that the marker applies battery voltage to the HB9 lead causing the nine hundreds block relay 119 to operate. The marker also applies battery to one of the ten units leads U0 to U9. Assume for purposes of illustration that it applies battery to the units lead U0 causing the operation of the units relay 130.

The hundreds block relay 119 in operating applies ground to a conductor extending back to the marker circuit indicating that the hundreds block relay has operated and also indicating the character of the called number. In other words, the operation of the hundreds relay 119 indicates to the marker that the called number is a physical number, a theoretical number or a non-discriminating number. As shown in the drawing, relay 119 is cross-connected to apply ground to the PN lead indicating physical numbers while relay 110 is cross-connected to apply ground to the TN lead indicating theoretical numbers.

The terms "physical numbers" and "theoretical numbers" and "non-discriminating numbers" as used herein merely differentiate three different groups of numbers. For example certain subscribers in other offices may be permitted to reach physical numbers but not theoretical numbers, or vice versa. The lead grounded by the operation of the hundred block relay enables the marker to make this discrimination in treatment. On the other hand if a hundred block relay grounds the PTN lead, any subscriber is permitted to reach the called number in that hundred block. In addition to indicating the class of the called number, the grounding of the PN, TN or PTN leads provides a check to the marker that a hundred block relay has operated. It is to be understood that similar translating equipment is provided for other of the thousands digits of other called subscriber's directory numbers.

In addition to checking the operation of a hundreds block relay TIK marker checks the operations of a units relay by causing this relay to complete another checking circuit to the marker over lead UK. Other tests and checks may be employed as set forth in the above-identified application Serial No. 57,394.

Figures 4, 5:
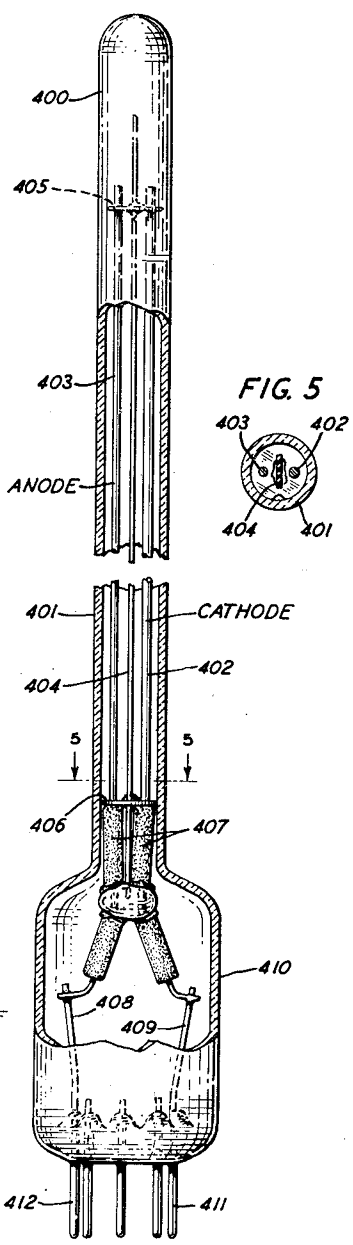
Fig. 4 shows details of the tubes suitable for use in combination with the card translator.
Fig. 5 shows a cross section along line 5—5 of Fig. 4 of the elongated reduced portion of the tube which cooperates with the cards.

When ground is applied by any of the hundreds block relays such as relay 119 to any one of the three leads, P, PN, PTN, such as PN by relay 119, the marker circuit applies battery to one of the ten tens leads to the number group circuit. Assume for example that the marker applies battery to the TB9 lead causing relay 129 to operate. Thus the relays 119, 129 and 130 will be operated in response to the subscriber's directory number 990. Other directory numbers will operate other relays, one in each of these three groups of relays. The operation of the three relays 119, 129 and 130 connects the signal generator 105 to the card 200 shown in Fig. 2 by means of the clip or connector 162. Thereupon the signal generator 105 transmits a spurt of alternating curent or a pluse of direct current. This current is applied across the resistor 161 to a conductor 163 on the card 200 in the card translator. The conducting material 163 upon this card is shown in Fig. 2 in greater detail and is applied to the lower surface of the card as seen in Fig. 2. Fig. 2 is a section through one of the cards along the section line 2—2 of Fig. 1. This conductive material may comprise a metallic foil, a chemical salt, or a conductive ink printed upon the card. This conducting material or wire 163 extends adjacent a group of the two electrode tubes as shown in Fig. 1. These tubes comprise an elongated gas or insulative envelope 401 as shown in Fig. 4. An anode and a cathode member extend throughout the major portion of this elongated envelope and are supported therein by means of the supports 405 and 406 which in turn are supported by the envelope 401 and the rod 404, which may be of insulating material. The base portion 410 as seen in Fig. 4 is somewhat enlarged and provides for bringing connections from the anode and cathode out through the envelope 401. These wires are insulatedly supported by insulator 407 in the base portion of the tube so that discharge does not take place in the base portion of the tube. The tube is filled with a gas of low pressure which may be readily ionized. Suitable gases comprise the inert group of gases such as argon and neon, as well as other gases or vapors including hydrogen, mercury vapor or other gases or vapors.

Figure 3:
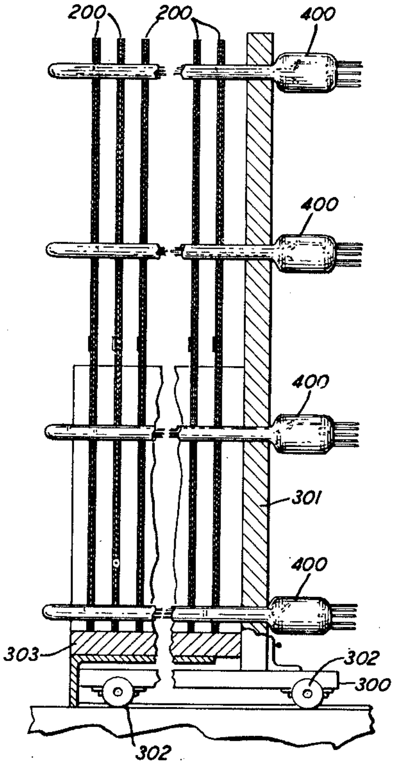
Fig. 3 is a partial section along line 3—3 of Fig. 1 and shows an exemplary manner in which the tubes may be mounted so that they may be readily withdrawn from the cards and the cards changed.

These tubes are mounted upon a platform or carriage 300 which is movably supported by means of wheels or rollers 302 shown in Figs. 1 and 3; Fig. 3 being a partial section of Fig. 1 along line 3—3. The platform or base member 300 supports a vertical member 301 in which the tubes 400 are mounted.

The cards 200 are supported by means of a card box or rack 303 which is arranged so that the platform 300 together with the tube supporting member 301 may be moved to the right as shown in Fig. 3 for removing the tubes from perforations in the cards. When the tubes are thus removed from the cards, the card may be removed from the file or replaced as desired and then the tubes reinserted by moving the supporting member 301 back into the position shown where the tubes are in position for use by the machine switching equipment. As shown in Fig. 3 the cards are uniformly spaced. Such an arrangement is not essential to satisfactory operation of the exemplary systems set forth herein. The translating arrangement will work equally well when the cards or card-like members are equally spaced, when they are tightly packed together, or when they are loosely supported and irregularly spaced.

With the tubes in position with the cards as shown in Fig. 3 and with the relays 119, 129 and 130 operated as assumed above, the signal generator 105 applies a change in voltage to the clip 162 attached to the selected card which is assumed to be card 200. The clip 162 connects the source signal generator 105 to the conducting element 163 on the face of the card or embedded in the card which, as shown in Fig. 1, extends adjacent the zero tube in the first column designated FT, Fig. 1. This conductor also extends to the No. 9 tube in the second column, the No. 4 tube in the third column, the No. 9 tube in the fourth column, No. 4 tube in the fifth column, and the No. 03 tube in the sixth column. The signal or voltage generated by the generator 105 is a changing voltage such as an alternating-current voltage, a pulse of short duration or a so-called step voltage, i. e., a voltage which changes abruptly from one value to another. Such voltages when applied to the conductor 162 extending adjacent to the outside of the above enumerated tubes will cause a discharge to be initiated within these particular tubes. This in turn operates relays such as 800 and 801 in the marker to give the marker the required information in regard to the location of the line equipment and the type of ringing to be used to reach the called number. The positive voltage on the windings of relays 800 and 801 is not sufficient to operate tubes 400 until a changing voltage is applied to conductor 163.

The voltage from the signal generator 105 is also applied across the network 161 comprising a resistor and condenser in parallel and creates a voltage drop across this network which is the same as the voltage applied to the conductor 163 on the card. A network similar to network 161 is connected between the clips attached to each of the cards and ground. The purpose of this network is to provide a low impedance path for stray currents so that when a voltage is applied to the clip 162 the induced voltage applied to the other clips of the other cards is shunted to ground through the grounded network connected to these clips. So long as the resistance or impedance of shunting elements such as 160, 161, etc., is very much lower than the impedance due to the stray capacities between the wires or conductors from all of the tens block relay such as 129, the voltage appearing across all of the networks except the one connected to the signal generator will be insufficient to initiate a discharge through any of the other tubes thus insuring proper operation of the translator tubes. These networks also prevent induced voltages due to stray fields from external sources of interference from causing false or improper operation of the tubes.

In most cases the impedance will be low enough to prevent any false operation of these tubes due to stray capacities between the conductors such as 163, of card 200 and similar conductors of other cards. In general, the stray capacities between these conductors will not materially increase the stray capacities between the rest of the circuits of these conductors including the clips and wiring to the relay contacts of tens block relay such as relay 129.

However, in some cases it may be desirable to further eliminate the effects of stray capacities by applying a shielding conductor to the other side of the card or embedded within the card and connecting this shielding conductor to ground, thus substantially eliminating any stray capacities between the conductors of different cards. The shields on the cards also prevent or reduce crossfire between a conductor on a card and unselected tubes. Thus, by providing the shields it may be possible to mount the tubes closer together and stack more cards in a given space.

In the arrangement shown in Fig. 2 the card 200 comprises two insulating sections, papers or plastic materials 167 and 164 separated by grounded shielding member 166 which member extends adjacent to all of the tubes of the translator. In the usual case the shielding member extends to within a predetermined distance of each of the tubes. However when desired this shielding member may be arranged so that it will not extend as close to the selected tubes as it does to all of the other tubes. As shown in Fig. 2 the shielding member 165 extends between the insulating members 167 and 164. The clip 166 is connected to the shielding member and to ground as shown in Fig. 1. The conductor 163 in the exemplary embodiment shown in Fig. 2 is applied to the lower face of the card as seen in Fig. 2.

The card 200 may be located anywhere within the group of cards in the card rack or file 303. The tubes are not critical as to where along the length of the elongated reduced portion the discharge initiated potential is applied. They appear to work equally well when the discharge initiating potential is applied anywhere along the elongated portion of the tube.

As shown in Fig. 1 the cathodes of the tubes are connected to ground while the anodes of the tubes extend over conductors through the number group connector circuit to a source or sources of anode battery through relay windings which relays are located in the marker circuit. The operation of these relays indicates to the marker the location of the called subscriber's line and also other necessary information for ringing the right party on the line. Thus the tubes in the first column designated FT designate the tens lead corresponding to the tens digit designating the line link frame upon which the called subscriber's line appears. As shown in Fig. 1 there are four of these leads and thus four tubes in the card field designated zero to 3 in Fig. 1. The next column is employed to designate the units digit of the line link frame upon which the called subscriber's line appears. As shown in Fig. 1 ten tubes are provided in this column, one for each of the ten digits. The next column designated VG is provided with fourteen tubes which will cause the operation of one of fourteen relays in the marker circuit designating the vertical group of lines on the designated line link frame wherein the called line appears. The next column designated HG similarly designates the horizontal group while the next column designated VF designates the vertical file. The last column is employed for indicating special information relative the ringing potential to be applied to the line.

The marker upon receiving the information of translated code over the leads from the tubes due to the operation of the relays described above then proceeds to dismiss the number group circuit including the translator and to thereafter control the switches so that connections may be set up to the desired calling line if it is idle. If the line is idle, ringing current is applied to it and the call proceeds in the normal manner as described in the above-identified Busch application.

Upon release of the translator as shown in Fig. 1, it becomes available for use by another marker circuit or the same marker circuit.

As shown in Fig. 1 a group relay 150 is provided for each P. B. X line group and is operated in parallel with the tens block relay such as 119 when there are P. B. X lines in this block of ten numbers having 9 as the hundreds digit and 9 as the tens digit. Assume that the group of P. B. X lines to the P. B. X, having its directory number in that tens group represented by relay 129, has less than ten lines. Under these circumstances, the operation of relay 150 extends circuits from the sleeves of busy conductors of all lines in the P. B. X group to the marker circuit so that the marker circuit may pick out one of these lines, which is idle at that time. The operation of the translating equipment and also the marker in response to P. B. X calls is then substantially the same as set forth in the above-identified application of Busch.

If the P. B. X group of lines extending to the P. B. X selected by the operation of relays 119 and 129 exceeds 10 and if all of the first ten of these lines are busy, then relay 151 is operated which provides means of operating another relay similar to 150 after 150 has been released. This second relay connects the sleeves of busy conductors of ten additional lines to the marker circuit so that these lines may be tested for busy. If all of these lines are busy, then a similar relay is operated for extending another group of lines to the marker circuit and so on until all of the lines extending to the desired P. B. X have been tested. The operation of the translating equipment and also the marker circuit in response to P. B. X numbers where there are more than ten lines to a given P. B. X is substantially the same as set forth in the above-identified application of Busch.

Figure 6:
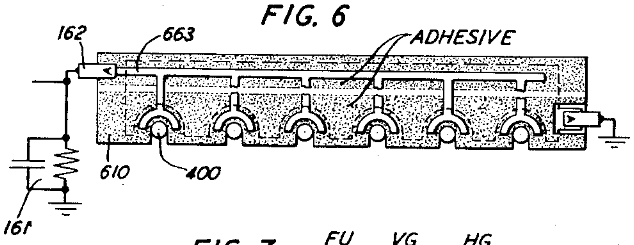
Fig. 6 shows a simplified form of card suitable for use where only a small number of translations are required.

Fig. 6 shows a modified card or card-like member which is shown on top of a plurality of tubes 400. In cases where only a few tubes are required, the card similar to 610 shown in Fig. 6 may be provided and merely placed on top of a row of tubes as shown in Fig. 6. These cards may readily be replaced in case it is desired to change the translation. Cards are provided with a conducting member 663 which is arranged to extend adjacent to a plurality of the tubes. Tubes may be selected by extending the conducting member 663 to the desired or selected tube. The application of the changing alternating potential which may be a sinusoidal alternating current, an alternating current of the step-wave form of a square wave form, or of other changing pulse or direct current, to the network 161 of Fig. 6 and through the clip 162 of Fig. 6 to the conductor 663 and thus to the selected tubes 400 causes a discharge to be initiated within these tubes in the manner similar to that described above.

The card arrangement shown in Fig. 6 may be readily arranged so that the proper tube or tubes may be easily selected. In constructing the card, conducting material is applied to the card by means of adhesive. The adhesive may be in the form of varnish or other insulating material and the conducting material may take the form of metallic foil or other suitable conducting materials such as metallized paper, metallized plastics, or similar materials. The conducting material is arranged to extend to all of the tubes. However, the adhesive is not applied to a line, strip or zone on the card across which the conducting material extends to each of the tubes. Consequently, the conducting material across this strip, line or zone may be readily removed by scratching with a finger nail, file or other suitable instrument. Thus, the conducting material is removed from all but the selected tubes and then the clip connected to the material on the card and the card placed over the tubes as shown in Fig. 6.

It is, of course, possible to provide U-shaped cards for two rows of tubes, E-shaped cards for three rows of tubes and similar shapes for additional rows of tubes when desired. It is also possible to extend the conductors which are selected under control of the input information to more than one clip such as 162 connected to more than one card, which cards may be on the same or usually different rows of tubes thus giving an expanded output for the card arrangements shown in Fig. 6. Alternatively when it is desired to operatively associate a large number of cards with a given group of tubes, cards similar to those shown in Fig. 6 may be provided on both the upper and lower sides of the tubes. Where it is desirable to associate still more cards with a given group of tubes two or more sets of tubes may be connected in parallel and different sets of cards associated with the different parallel groups of tubes.

When desired, these cards may be provided with a shield member such as 665 similar to the shield member 165 of cards 200.

Figure 7:
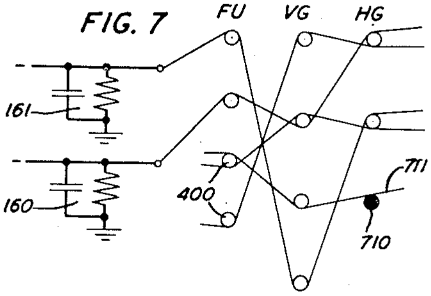
Fig. 7 shows a modified form of translator embodying this invention.

Fig. 7 shows in modified form a translator in accordance with this invention which does not employ cards or similar members to support the discharge initiating conductors or electrodes. In this case, the tubes are supported in any suitable manner as, for example, in tube sockets in the usual manner and then the conductors extending from the networks 160, 161 etc. are woven or wound around or adjacent to the desired tubes as illustrated in Fig. 7. As shown in Fig. 7 three columns of tubes similar to the groups of tubes in Fig. 1 are shown. It is to be understood, however, that any desired or suitable number of columns or other arrangements of tubes may be provided. Furthermore, additional members may be provided in any row of tubes on which the wire may be wound or woven for support when it is desired that the wire should not pass adjacent to any tube in a given column, in other words, when it is desired that the application of a changing voltage or current condition to a selected wire should not initiate a discharge through any tube of a column. Such a supporting member is illustrated at 710 of Fig. 7 where the conductor 711 passes adjacent this member instead of one of the tubes shown in this column.

It is to be understood that the above-described arrangements are illustrative of the application of the principles of the invention. Numerous other arrangements may be devised by those skilled in the art without departing from the spirit and scope of the invention.

Furthermore, the various checks between the marker circuit and translating circuits such as disclosed in the above-identified application of Busch may be provided to insure that the desired circuits from the marker to the translating circuits are completed and then circuits from the translating circuits, back to the marker are also completed in a manner similar to that set forth in the above-identified application of Busch. While all of these various checking circuits have not been shown herein, we understood that they may be provided when desired, and when so provided that they operate in their usual manner and cooperate with the various elements of the marker and translator circuits to provide the desired or necessary checks of the operation of both circuits.

What is claimed is:

1. In combination, a plurality of gaseous conduction tubes having an anode and a cathode extending through a major portion of said tubes, a plurality of discharge initiating conductors wholly external to said tubes and electrically insulated from all of the electrodes of said tubes and arranged adjacent predetermined ones of said tubes, means for selecting one of said discharge initiating conductors, and means for applying a discharge initiating electrical condition to said selected conductor for initiating discharges through the tubes adjacent to said selected conductor.

2. In a telephone switching system, a translating arrangement for translating the directory number of the called subscriber into conditions designating the location of the called line in terms of selections required by the switching equipment to establish a path to the line, comprising a plurality of elongated gaseous conduction tubes having an anode and a cathode extending through a major portion of said tubes, a plurality of selectable conducting members arranged adjacent to selected groups of said tubes, means for selecting one of said conductors under control of the directory number of a called subscriber, apparatus for applying an electrical discharge initiating condition to said selected conductor for initiating discharges through the selected tubes and apparatus for registering the discharges created through said tubes.

3. In combination, a plurality of gaseous conduction tubes having an anode and a cathode extending through a major portion of said tubes, a plurality of flat card-like members, means for supporting said card-like members adjacent said tubes and a discharge initiating electrode supported by said card-like members and passing adjacent to but external to a selected group of one or more of said tubes, and means for applying a discharge initiating potential to said electrode supported by said card-like members.

4. In combination, a plurality of gaseous conduction tubes having an elongated portion, an anode and a cathode extending through a major part of said elongated portion of said tubes, a plurality of flat card-like members having cut out portions for said tubes, means for supporting said cards with said cut out portions adjacent said tubes, a discharge initiating electrode supported by said card-like members and passing adjacent to but external to a selected group of one or more of said tubes and apparatus for applying a discharge initiating potential to said electrode supported by said card-like members.

5. In combination, a plurality of gaseous conduction tubes having an anode and a cathode extending through a major portion of said tubes, a plurality of flat card-like members having notches in the edge thereof, means for supporting said cards with said notches adjacent said tubes, a discharge initiating electrode supported by said card-like members and passing adjacent to but external to a selected group of one or more of said tubes, and means for applying discharge initiating potential conditions to said electrode for initiating discharges through the tubes to which said electrode passes adjacent.

6. In combination, a plurality of elongated gaseous conduction tubes arranged in a horizontal row, an anode and a cathode extending through a major portion of said elongated tubes, a plurality of flat card-like members having tabs on an edge thereof, means for supporting said card-like members over said tubes with said tabs extending in part at least between said tubes, a discharge initiating electrode individual to and supported by said card-like members and passing adjacent to but external to a selected group of one or more of said tubes, and means for applying a discharge initiating electrical voltage to one of said electrodes.

7. In combination, a plurality of elongated gaseous conduction tubes having an anode and a cathode extending through the major elongated portion of said tubes, a plurality of flat card-like members, means for supporting said card-like members adjacent said tubes, electrostatically shielding means insulatively supported by said card-like members, means for controlling the potential of said shield member, a discharge initiating electrode also insulatively supported by said card-like members and passing adjacent a selected group of one or more of said tubes, and apparatus for applying a discharge initiating potential to said electrode.

8. In combination, a plurality of gaseous conduction tubes having an anode and a cathode extending through a major portion of said tubes, a plurality of flat card-like members, means for inserting said tubes through holes or punches in said card-like members, a discharge initiating electrode supported by said card-like members and passing adjacent but external to a selected group of one or more of said tubes, and means for applying a discharge initiating potential to said electrode supported by said card-like members.

9. In combination, a plurality of elongated gaseous conduction tubes having an anode and a cathode extending through the major elongated portion of said tubes, a plurality of flat card-like members, means for inserting said tubes through said card-like members, electrostatic shielding means insulatively supported by said card-like members, means for controlling the potential of said shield member, a discharge initiating electrode also insulatively supported by said card-like members and passing adjacent a selected group of one or more of said tubes, and means for applying a discharge initiating potential to said electrode.

10. In combination, a plurality of elongated gaseous conduction tubes having electrodes extending through a major portion of said elongated tube, a plurality of flat card-like members, means for supporting said tubes adjacent said card-like members, apparatus for moving said tubes relative to said card-like members for inserting said tubes and withdrawing the same from said card-like members, a discharge initiating electrode insulatively supported by said card-like members passing adjacent a selected group of one or more of said tubes, and means for applying a discharge initiating electrical condition to said electrode.

11. In combination, a plurality of two-element gaseous conduction tubes having elongated portions, electrodes extending throughout a major part of said elongated portion, means for inserting said tubes through similar positions in all of said cards, a discharge initiating electrode insulatively supported by each of a plurality of said card-like members, and passing adjacent but external to a selected group of one or more of said tubes, impedance means extending between said discharge initiating electrode and one of the elements of said tubes for by-passing stray currents and preventing improper operation of said tubes, and apparatus for applying a discharge initiating condition to said electrode and across said impedance element.

12. A translating arrangement comprising in combination a plurality of card-like members, a plurality of gaseous conduction tubes having elongated electrodes within said tubes extending through said card-like members, apparatus responsive to a plurality of input conditions for selecting one of said cards, a discharge initiating electrode insulatively supported by each of a plurality of said card-like members and passing adjacent to but external to a selected group of one or more of said tubes, apparatus for applying a discharge initiating condition to said electrode supported by the selected card for initiating discharges through each tube of said selected group of one or more tubes, and output circuits controlled by the discharges initiated through said tubes.

13. In a telephone switching system a translating arrangement for translating the directory number of a called subscriber into conditions designating the location of the called line in terms of selections required by the switching equipment to establish a path to the line comprising a plurality of card-like members, means for selecting one of said card-like members under control of the directory number of a called subscriber, a plurality of electron discharge tubes extending through said card-like members, a control member individual to and insulatively supported by each of said card-like members extending adjacent to a selected plurality of said tubes, apparatus for applying a discharge initiating condition to said control member supported by said selected card for initiating discharges through said selected tubes, and apparatus for registering the discharges created through said tubes.

14. In combination, a plurality of gaseous conduction tubes having an anode and a cathode extending through a major portion of said tubes, a plurality of flat card-like members, means for inserting said tubes through holes or punches in said card-like members, a discharge initiating electrode supported by said card-like members and passing adjacent but external to a selected group of one or more of said tubes, means for applying an alternating current to said discharge initiating electrode to initiate the discharge within the selected groups of tubes to which said discharge initiating electrode extends.

15. In combination, a plurality of gaseous conduction tubes having an anode and a cathode extending through a major portion of said tubes, a plurality of flat card-like members, means for inserting said tubes through holes or punches in said card-like members, a discharge initiating electrode supported by said card-like members and passing adjacent but external to a selected group of one or more of said tubes, apparatus for applying a pulse of rapidly changing amplitude and short duration to said discharge initiating electrode for initiating discharges through the selected group of tubes which are adjacent to said discharge initiating electrode.

THOMAS L. DIMOND.

REFERENCES CITED

The following references are of record in the file of this patent:

UNITED STATES PATENTS

| Number | Name | Date |
|---|---|---|
| 1,960,245 | Henninger | May 29, 1934 |

FOREIGN PATENTS

| Number | Country | Date |
|---|---|---|
| 454,116 | Great Britain | Sept. 24, 1936 |